United States Patent
Mannebach et al.

(10) Patent No.: US 8,716,423 B2
(45) Date of Patent: May 6, 2014

(54) POLYETHYLENE FOR ROTOMOULDING

(75) Inventors: Gerd Mannebach, Münstermaifeld (DE); Heinz Vogt, Frankfurt (DE); Fabiana Fantinel, Verona (IT); Shahram Mihan, Bad Soden (DE); Peter Bisson, Ludwigshafen (DE); Cees Besems, Rijen (NL); Gerhardus Meier, Frankfurt (DE); Ulf Schüller, Frankfurt (DE); Barbara Gall, Günzburg (DE); Iakovos Vittorias, Mainz (DE); Manfred Hecker, Neustadt Wied (DE); Michael Olmscheid, Odenthal (DE)

(73) Assignee: Basell Polyolefine GmbH, Wesseling (DE)

( * ) Notice: Subject to any disclaimer, the term of this patent is extended or adjusted under 35 U.S.C. 154(b) by 104 days.

(21) Appl. No.: 13/390,924

(22) PCT Filed: Aug. 20, 2010

(86) PCT No.: PCT/EP2010/005119
§ 371 (c)(1),
(2), (4) Date: Feb. 16, 2012

(87) PCT Pub. No.: WO2011/020622
PCT Pub. Date: Feb. 24, 2011

(65) Prior Publication Data
US 2012/0148777 A1 Jun. 14, 2012

(30) Foreign Application Priority Data

Aug. 21, 2009 (EP) .................................... 09010749

(51) Int. Cl.
*C08F 210/14* (2006.01)
*C08F 10/14* (2006.01)

(52) U.S. Cl.
USPC .................. 526/348.5; 526/348.4; 526/348.2; 526/348; 526/113; 526/115; 526/116; 526/117

(58) Field of Classification Search
USPC ............. 526/348, 348.5, 118, 113, 160, 170, 526/161, 172, 169.1, 348.2, 117, 115, 116
IPC ......... C08F 210/14,2500/04, 2500/12, 2410/03, C08F 2420/00, 2500/17
See application file for complete search history.

(56) References Cited

U.S. PATENT DOCUMENTS

| | | | |
|---|---|---|---|
| 3,852,265 A | 12/1974 | Hartenstein | |
| 3,953,655 A | 4/1976 | Steinkamp et al. | |
| 4,001,172 A | 1/1977 | Steinkamp et al. | |
| 5,008,204 A | 4/1991 | Stehling | |
| 5,037,909 A | 8/1991 | Schramm | |
| 6,174,981 B1 * | 1/2001 | Bergmeister et al. | 526/348.2 |
| 6,248,845 B1 * | 6/2001 | Loveday et al. | 526/113 |
| 6,262,196 B1 * | 7/2001 | Mecking | 526/114 |
| 6,465,386 B1 * | 10/2002 | Maddox et al. | 502/155 |
| 7,208,559 B2 * | 4/2007 | Satoh et al. | 526/348.6 |
| 7,332,543 B2 * | 2/2008 | Follestad et al. | 525/191 |
| 7,456,244 B2 * | 11/2008 | Michie et al. | 526/348 |
| 7,666,959 B2 * | 2/2010 | Razavi | 526/115 |
| 7,767,613 B2 * | 8/2010 | Mihan | 502/113 |
| 7,928,051 B2 * | 4/2011 | Kipke et al. | 510/352 |
| 8,008,403 B2 * | 8/2011 | Kipke et al. | 525/240 |
| 8,039,569 B2 * | 10/2011 | Kipke et al. | 526/348 |
| 8,067,518 B2 * | 11/2011 | Davey et al. | 526/348 |
| 8,070,005 B1 * | 12/2011 | Kruger et al. | 220/4.13 |

FOREIGN PATENT DOCUMENTS

| | | | |
|---|---|---|---|
| EP | 1749058 | 11/2008 | |
| JP | 2007-137920 A * | 6/2007 | ............ C08L 23/08 |
| WO | WO-9303093 | 2/1993 | |
| WO | WO-98/27124 | 6/1998 | |
| WO | WO-03002617 | 1/2003 | |
| WO | WO 2005/103095 A1 * | 11/2005 | ............ C08F 10/02 |
| WO | WO-2005103095 | 11/2005 | |
| WO | WO-2006120418 | 11/2006 | |
| WO | WO 2009/103516 A * | 8/2009 | ............ C09J 151/06 |

OTHER PUBLICATIONS

Chen, Yaofeng et al., "Halogen-Substituted 2,6-Bis(imino)pyridyl Iron and Cobalt Complexes: Highly Active Catalysts for Polymerization and Oligomerization of Ethylene", Organometallics, 2003, 22 2003, 4312-4321.
Peacock, Andrew J. , "Handbook of Polyethylene", Exxon Chemical Company, Baytown, Texas Marcel Dekker Inc., New York/Basel 2000 , 7-10.
Small, Brooke L. et al., "Highly Active Iron and Cobalt Catalysts for the Polymerization of Ethylene", J.Am. Chem. Soc. 1998 , 4049-4050.
Britovsek, G. et al., "Novel Olefin Polymerization Catalysts based on Iron and Cobalt", Chem. Commun. 1998 , 849-850.
Randall, J. , "A Review of High Resolution Liquid (13) Carbon Nuclear Magnetic Resonance Characterizations of Ethylene-Based Polymers", JMS-Rev. Macromol. Chem. Phys. C29 (2&3) 1989 , 201-317.
Kakugo, M. et al., Macromolecules, 15, 4, 1150 1982.
Wild, L et al., "Determination of Branching Distributions in Polyethylene and Ethylene Copolymers", Journal Polymer Sci. Part B 1982 , 441-456.
Carman, C.J. et al., Macromolecules, 10, 3, 536 1977.
Holtrup, Wolfgang , "Zur Fraktionierung von Polymeren durch Direktextraktion", Makromol. Chem. 178 1977 , 2335-2349.
Raff and Doak, "High Polymers", Interscience Publishers, John Wiley & Sons Vo. XX 1965 , 442-443.
Burkhardt, U. , "Preparation of Polymers Having New Properties", Conference Baden-Baden Nov. 29-30, 1995/VDI-Gesellschaft Kunststofftechnik (Plastics Technology) Dusseldorf: VDI-VER1., 1995, ISBN 3-18-234191-X Aufbereiten von Polymeren mit neuartigen Eigenschaften Nov. 29, 1995 , 3 pages.
S. Strauss, Chem. Rev. 1993, 93, 927-942.
Wild et al. J. Poly. Sci., Poly. Phys. Ed. vol. 20, (1982).

\* cited by examiner

Primary Examiner — Rip A. Lee

(57) ABSTRACT

A novel polyethylene is devised which polyethylene is particularly advantageous for manufacturing rotomoulded articles.

20 Claims, No Drawings

POLYETHYLENE FOR ROTOMOULDING

This application is the U.S. national phase of International Application PCT/EP2010/005119, filed Aug. 20, 2010, claiming priority to European Application 09010749.1 filed Aug. 21, 2009; the disclosures of International Application PCT/EP2010/005119 and European Application 09010749.1, each as filed, are incorporated herein by reference.

DESCRIPTION

The present invention relates to a novel polyethylene for rotomoulding of large, hollow objects.

Rotomoulding is a moulding technique suitable for moulding large, hollow objects. A mould is prefilled with flowable, granulated polymer, is heated with a temperature profile firstly softening the material, and finally for some shorter period melting down the material, then cooling down again. All this is done whilst the mould is kept in motion, for allowing of even distribution of the material, filling even minor cavities of the mould and ideally achieving even, controllable wall thickness.

As is described in EP-1749 058 A, formation of foam or at least air bubbles within the polymeric material during said rotomoulding process is a problem, necessitating the addition of polyether-block copolyamides as densification aid at least when using polyethylene polymers. It is an object of the present invention to devise an new, improved rotomoulding material avoiding the need for using densification additives.

This object is solved by the novel polyethylene of the present invention. According to the present invention, a polyethylene, optionally addressed as 'polyethylene a)', 'polymer a)' or 'polymer component a)' hereafter, which most preferably is a polyethylene homo- and/or ethylene copolymer which is a copolymer of ethylene with $C_3$-$C_{20}$-alkene, which polyethylene has molar mass distribution width (MWD) or polydispersity $M_w/M_n$ of from 7 to 15, a narrow medium density range (MDPE) and a narrow melt viscosity range (melt index) as specified below in the claims, a weight average molar mass $M_w$ of from 20000 g/mol to 500 000 g/mol, preferably it has of from 0.7 to 20 $CH_3$/1000 carbon atoms and again preferably it has at least 0.6 vinyl groups/1000 carbon atoms.

Examples of suitable $C_3$-$C_{20}$-alkenes according to the present invention are e.g. α-olefins such as propene, 1-butene, 1-pentene, 1-hexene, 4-methyl-1-pentene, 1-heptene or 1-octene. Preferably, the $C_3$-$C_{20}$-alkenes are α-olefins. The ethylene copolymer a) preferably comprises α-alkenes having from 4 to 8 carbon atoms in copolymerized form as comonomer unit. Particular preference is given to using α-alkenes selected from the group consisting of 1-butene, 1-hexene and 1-octene.

The number of side chains formed by incorporation of the comonomer and their distribution, is very different when using the different catalyst systems. The number and distribution of the side chains has a critical influence on the crystallization behavior of the ethylene copolymers. While the flow properties and thus the processability of these ethylene copolymers depends mainly on their molar mass and molar mass distribution, the mechanical properties are therefore particularly dependent on the short chain branching distribution. The crystallization behavior of the ethylene copolymers during cooling of the film extrudate is an important factor in determining how quickly and in what quality a film can be extruded. The correct combination of catalysts for a balanced combination of catalysts for a balanced combination of good mechanical properties and good processability is a crucial factor here.

According to the present invention, a copolymer is to be understood as a co-polymer of ethylene with at least one comonomer, that is, a 'copolymer' according to the present invention also encompasses terpolymer and higher, multiple comonomer co-polymerizates. As opposed to a homopolymer, a co-polymer thus comprises at least >3.5.% (w/w) of a comonomer in addition to ethylene, based on total weight of said copolymer. In a preferred embodiment though, a 'copolymer' is a truly binary co-polymerizate of ethylene and of substantially one species of comonomer only. 'substantially one species' preferably means that >97% (w/w) of comonomer amounts to one comonomer molecule.

Preferably, the polymer component a) has a CDBI of 20-70%, preferably of less than 50%. CDBI (composition distribution breadth index) is a mesure of the breadth of the distribution of the composition. This is described, for example, in WO 93/03093. The CDBI is defined as the percent by weight or mass fraction of the the copolymer molecules having a comonomer contents of ±25% of the mean molar total comonomer content, i.e. the share of comonomer molecules whose comonomer content is within 50% of the average comonomer content. This is determined by TREF (temperature rising elution fraction) analysis (Wild et al. J. Poly. Sci., Poly. Phys. Ed. Vol. 20, (1982), 441 or U.S. Pat. No. 5,008,204). Optionally, it may be determined by more recent CRYSTAF analysis.

Definition of $M_w$, $M_n$, MWD can be found in the 'Handbook of PE', ed. A. Peacock, p. 7-10, Marcel Dekker Inc., New York/Basel 2000. The determination of the molar mass distributions and the means Mn, Mw and Mw/Mn derived therefrom was carried out by high-temperature gel permeation chromatography using a method basically described in DIN 55672-1:1995-02 issue Februar 1995. The deviations according to the mentioned DIN standard are as follows: Solvent 1,2,4-trichlorobenzene (TCB), temperature of apparatus and solutions 135° C. and as concentration detector a PolymerChar (Valencia, Paterna 46980, Spain) IR-4 infrared detector, suitable for use with TCB. Further details are given in the examples section.

The polyethylene a) of the invention has a molar mass distribution width $M_w/M_n$ preferably of from 7 to 15. Further preferred, the weight average molar mass $M_w$ of the polyethylene a) of the invention is in the range of from 20 000 g/mol to 500 000 g/mol, preferably from 40 000 g/mol to 200 000 g/mol and more preferably from 50 000 g/mol to 150 000 g/mol.

Preferably, the z average molar mass $M_z$ of the polyethylene of the invention is in the range of less than 1 million g/mol, preferably of from 200 000 g/mol to 800 000 g/mol. The definition of z-average molar mass $M_z$ is e.g. defined in Peacock, A. (ed.), Handbook of PE, and is published in High Polymers Vol. XX, Raff and Doak, Interscience Publishers, John Wiley & Sons, 1965, S. 443.

The HLMI and MI, respectively, of the polyethylene a) of the invention is narrowly defined, as given in the claim. It is clear that for rotomoulding, a less viscous polyethylene has advantages in processing, however, may have adverse effect on formation of bubbles and controlling wall thickness. The polyethylene of the present invention allows of such reduced viscosity but without suffering from said adverse, balancing effects. For the purposes of this invention as is well known to the skilled person, the expression "HLMI" means "high load melt index" and is determined at 190° C. under a load of 21.6 kg (190° C./21.6 kg) in accordance with ISO 1133. Preferably, the HLMI of the polyethylene a) of the invention, suitably for use in rotomoulding, has a HLMI of from 190 g/10 min. up to 320 g/10 min. Likewise, the melt index "MI" is the melt rheology value determined at the same temperature but under a load of 2.16 kg only according to said standard method. Further, preferably the amount or weight fraction of the polyethylene of the invention having a molar mass of <1 million g/mol, as determined by GPC for standard determination of the molecular weight distribution, is preferably above 95.5% by weight, preferably above 96% by weight and particularly preferably above 97% by weight. This is determined in the usual course of the molar mass distribution measurement by applying the WIN-GPC software of the company 'HS-Entwicklungsgesellschaft für wissenschaftliche Hard-und Software mbH'. Ober-Hilbersheim/Germany, for instance.

The polyethylene a) of the invention preferably has at least 0.6 vinyl groups/1000 carbon atoms, e.g. of from 0.6 up to 2 vinyl groups/1000 carbon atoms, preferably of from 0.9 to 10 vinyl groups/1000 carbon atoms and more preferably of from 1 to 5 vinyl groups/1000 carbon atoms and most preferably of from 1.2 to 2 vinyl groups/1000 carbon atoms. The content of vinyl groups/1000 carbon atoms is determined by means of IR, according to ASTM D 6248-98. For the present purposes, the expression vinyl groups refers to —CH=$CH_2$ groups; vinylidene groups and internal olefinic groups are not encompassed by this expression. Vinyl groups are usually attributed to a polymer termination reaction after an ethylene insertion, while vinylidene end groups are usually formed after a polymer termination reaction after a comonomer insertion. Preference is given to at least 0.9 vinyl groups/1000 carbon atoms, preferably from 1 to 3 vinyl groups/1000 carbon atoms and particularly preferably from 1.3 to 2 vinyl groups/1000 carbon atoms being present in the 20% by weight of the polyethylene having the lowest molar masses. This can be determined by solvent-nonsolvent fractionation, later called Holtrup fractionation as described in W. Holtrup, Makromol. Chem. 178, 2335 (1977) coupled with IR measurement of the different fractions, with the vinyl groups being measured in accordance with ASTM D 6248-98. Xylene and ethylene glycol diethyl ether at 130° C. were used as solvents for the fractionation. 5 g of polymer were used and were divided into 8 fractions.

The polyethylene a) of the invention preferably has at least 0.05 vinylidene groups/1000 carbon atoms, in particular from 0.1 to 1 vinylidene groups/1000 carbon atoms and particularly preferably from 0.14 to 0.4 vinylidene groups/1000 carbon atoms. The determination is carried out by IR measurement in accordance with ASTM D 6248-98.

The polyethylene of the invention has from 0.01 to 20 branches/1000 carbon atoms, preferably from 0.5 to 10 branches/1000 carbon atoms and particularly preferably from 1.5 to 8 branches/1000 carbon atoms. The branches/1000 carbon atoms are determined by means of $^{13}$C-NMR, as described by James. C. Randall, JMS-REV. Macromol. Chem. Phys., C29 (2&3), 201-317 (1989), and refer to the total content of $CH_3$ groups/1000 carbon atoms including end groups. The branching contents is to be understood as side chains measured as $CH_3$/1000 carbon atoms, preferably from 1 to 10 $CH_3$/1000 carbon atoms. It is particularly preferred in polyethylene copolymerized with 1-butene, 1-hexene or 1-octene as the 1-alkene to have of from 0.01 to 20 ethyl, butyl or hexyl short chain branches/1000 carbon atoms, more preferably from 1 to 10 ethyl, butyl or hexyl branches/1000 carbon atoms and particularly preferably of from 2 to 6 ethyl, butyl or hexyl branches/1000 carbon atoms. It may otherwise be coined 'short chain branching' (SCB) with such side branches being $C_2$-$C_6$ side chains.

Strongly preferred, according to the present invention, is that the polyethylene component a) has a substantially multimodal, preferably bimodal, distribution in TREF analysis, determining the comonomer content based on crystallinity behaviour/melting temperature essentially independent of molecular weight of a given polymer chain. A polymer chain is a single molecule constituted by covalent bonding and obtained from polymerisation of olefines, said polymer chain having a molecular weight of at least 5000. A TREF-multimodal distribution means that TREF analysis resolves at least two or more distinct maxima indicative of at least two differing branching rates and hence conomonomer insertion rates during polymerization reactions. TREF analysis analyzes comonomer distribution based on short side chain branching frequency essentially independent of molecular weight, based on the crystallization behaviour (Wild, L., Temperature rising elution fractionation, Adv. Polymer Sci. 98: 1-47, (1990), also see description in U.S. Pat. No. 5,008,204 incorporated herewith by reference). Optionally to TREF, more recent CRYSTAF technique may be employed to the same end. Typically, in a preferred embodiment of the present invention, component a) comprises at least two, preferably substantially two, different polymeric subfractions synthesized preferably by different single-site catalysts, namely a first preferably non-metallocene-one having a lower comonomer contents, a high vinyl group contents and preferably a broader molecular weight distribution, and a second, preferably metallocene one having a higher comonomer contents, a more narrow molecular weight distribution and, optionally, a lower vinyl group contents. Further preferred, typically, the numeric value for the z-average molecular weight of the first or non-metallocene subfraction will be smaller or ultimately substantially the same as the z-average molecular weight of the second or metallocene subfraction. Preferably, according to TREF analysis, the 40% by weight or mass fraction, more preferably 5-40%, most preferably 20% by weight of the polyethylene component A) having the higher comonomer content (and lower level of crystallinity) have a degree of branching of from 2 to 40 branches/1000 carbon atoms and/or the 40% by weight or mass fraction, more preferably 5-40%, most preferably 20% by weight of the polyethylene component A) having the lower comonomer content (and higher level of crystallinity) have a degree of branching of less than 2, more preferably of from 0.01 to 2 branches/1000 carbon atoms. Likewise it may be said that where the polyethylene component A) displays a multimodal, that is at least bimodal distribution in GPC analysis, preferably the 5-40% by weight of the polyethylene a) of the invention having the highest molar masses, preferably 10-30% by weight and particularly preferably 20% by weight, have a degree of branching of from 1 to 40 branches/1000 carbon atoms, more preferably of from 2 to 20 branches/1000 carbon atoms. It is a characteristic of the product of the metallocene catalyst A) giving rise to this subfraction of the polyethylene of component a). Likewise it may preferably be said that due to the preferably more broadly distributed non-metallocene catalyst subfraction of component A), usually both with bimodal or substantially monomodal GPC distribution curves for component a), the 30%, preferably 15%, more preferably 5% by weight of the polyethylene having the lowest molar masses have a degree of branching of less than 5 branches/1000 carbon atoms, more preferably of less than 2 branches/1000 carbon atoms. Furthermore, it is preferred that at least 70% of the branches of side chains larger than $CH_3$ in the polyethylene of the invention are present in the 50% by weight of the polyethylene having the highest molar masses. The part of the polyethylene having the lowest or highest molar mass is determined by the method of solvent-nonsolvent fractionation, later called Holtrup fractionation as described and referenced in the forgoing already. Afore said 8 fractions are subsequently examined by $^{13}$C-NMR spectroscopy. The degree of branching in the various polymer fractions can be determined by means of $^{13}$C-NMR as described by James. C. Randall, JMS-REV. Macromol. Chem. Phys., C29 (2&3), 201-317 (1989). The degree of branching simply is the total $CH_3$ group content/1000 carbon atoms, preferably in the high molecular weight fractions, and reflects the comonomer incorporation rate.

Preferably, the η(vis) value of the component a) is 0.3 to 7 dl/g, more preferably of from 1 to 1.5 dl/g or optionally more preferably of from 1.3 to 2.5 dl/g. η (vis) is the intrinsic viscosity as determined according to ISO 1628-1 and -3 in Decalin at 135° C. by capillary viscosity measurement.

The polyethylene component a) of the present invention may be a monomodal or multimodal, that is at least biomodal, polyethylene homo- or copolymer as determined by high temperature gel permeation chromatography analysis (high temperature GPC for polymers according to the method described in DIN 55672-1:1995-02 issue Februar 1995 with specific deviations made as said above, in the section on determining Mw, Mn by means of HT-GPC). The molecular weight distribution curve of a GPC-multimodal polymer can be looked at as the superposition of the molecular weight distribution curves of the polymer subfractions or subtypes which will accordingly show two or more distinct maxima or will at least be distinctly broadened compared with the curves for the individual fractions. A polymer showing such a molecular weight distribution curve is called 'bimodal' or 'multimodal' with regard to GPC analysis, respectively. Such GPC-multimodal polymers, or multimodal polymers for short, can be produced according to several processes, e.g. in a multi-stage process in a multi-step reaction sequence such as described in WO 92/12182.

In one preferred embodiment, preferably in conjunction with employing a mixed system of at least two single-site catalysts according to the present invention, the polyethylene component a) has a substantially monomodal molecular mass distribution curve as determined by GPC, hence is monomodal in GPC, whilst it truly is a pseudo-monomodal product obtained by post-reactor blending or, particularly preferred according to the present invention, obtained as an in situ blend-reaction product of different catalysts, preferably single site catalysts, whose individual molecular weight distributions overlap and do not resolve as to display two distinct maxima any more. Modality in the present context is defined as the number of instances where the value of the differential function of said mass distribution is 0 (i.e. slope 0) and wherein said differential value changes from positive to negative sign for increasing molar masses at said point having said functional value of 0. The mass distribution curve is not required to be perfectly bell-shaped, therefore it is merely 'substantially' monomodal. Most preferably, such (pseudo-) monomodal reaction product being component A) of the adhesive composition of the present invention is obtained in situ in a one-pot reaction with a mixed or hybrid catalyst system, preferably with mixed single-site catalysts, giving rise to a particularly homogenous, in-situ mixture of different catalyst's products which homogeneity is not obtainable by conventional blending techniques.

The polyethylene of the invention preferably has a mixing quality measured in accordance with ISO 13949 of less than 3, in particular of from >0 to 2.5. This value is based on the polyethylene taken directly from the reactor, i.e. the polyethylene powder without prior melting in an extruder. This polyethylene powder is preferably obtainable by polymerization in a single reactor. The mixing quality of a polyethylene powder obtained directly from the reactor can be tested by assessing thin slices ("microtome sections") of a sample under an optical microscope. Inhomogeneities show up in the form of specks or "white spots". The specs or "white spots" are predominantly high molecular weight, high-viscosity particles in a low-viscosity matrix (cf., for example, U. Burkhardt et al. in "Aufbereiten von Polymeren mit neuartigen Eigenschaften", VDI-Verlag, Düsseldorf 1995, p. 71). Such inclusions can reach a size of up to 300 μm, they cause stress cracks and result in brittle failure of components. The better the mixing quality of a polymer, the fewer and smaller are these inclusions observed. The mixing quality of a polymer is determined quantitatively in accordance with ISO 13949. According to the measurement method, a microtome section is prepared from a sample of the polymer, the number and size of these inclusions are counted and a grade is determined for the mixing quality of the polymer according to a set assessment scheme.

The polyethylene of the invention preferably has a degree of long chain branching λ (lambda) of from 0 to 2 long chain branches/10 000 carbon atoms and particularly preferably from 0.1 to 1.5 long chain branches/10 000 carbon atoms. The degree of long chain branching λ (lambda) was measured by light scattering as described, for example, in ACS Series 521, 1993, Chromatography of Polymers, Ed. Theodore Provder; Simon Pang and Alfred Rudin: Size-Exclusion Chromatographic Assessment of Long-Chain Branch Frequency in Polyethylenes, page 254-269.

In general mixing of the additives and the polyethylene of the invention can be carried out by all known methods, though preferably directly by means of an extruder such as a twin-screw extruder. Films produced by film extrusion from the adhesive composition of the present invention are a further object of the present invention. The extruder technique is described e.g. in U.S. Pat. No. 3,862,265, U.S. Pat. No. 3,953,655 and U.S. Pat. No. 4,001,172, incorporated herewith by reference. The film extrusion process is preferably operated, according to the present invention, at a pressure of 100 to 500 bar and preferably a temperature of from 200 to 300° C.

The polyethylene component a) of the invention is obtainable using the catalyst system described below and in particular its preferred embodiments. Preferably, a single site catalyst or catalyst system is employed for providing said polyethylene a) according to the present invention. More preferably, the present invention further employs a catalyst composition comprising at least two different single-site polymerization catalysts A) and B) of which A) is at least one metallocene polymerization catalyst, preferably wherein A) is a hafnocene (A), and of which B) is at least one polymerization catalyst based on a non-metallocene transition metal complex, preferably wherein B) is an iron complex component which iron complex more preferably has a tridentate ligand (B).

Suitable metallocene and in particular hafnocene—catalysts A) are referenced and disclosed in WO 2005/103095 from the same inventors, said disclosure being incorporated herewith by reference.

Suitable catalysts B) preferaby are iron catalyst complexes of the general formulae (IIIa), preferably suitable for and capable of providing for a polyethylen product having a vinyl group content of at least 0.6 vinyl groups, in particular more than 0.9 vinyl groups/1000 C atoms, structure (IIIa) being

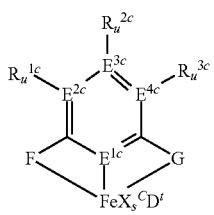

(IIIa)

wherein the variables have the following meaning:
F and G, independently of one another, are selected from the group consisting of:

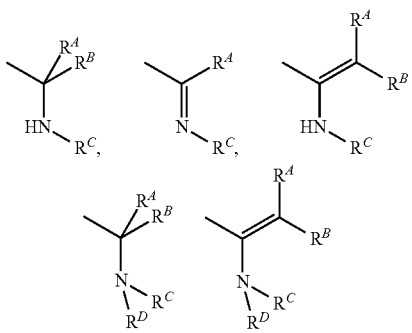

And further wherein preferably at least one of F and G is an enamine or imino radical as selectable from above said group, with the proviso that where F is imino, then G is imino with G, F each bearing at least one aryl radical with each bearing a halogen or a tert. alkyl substituent in the ortho-position, together giving rise to the tridentate ligand of formula IIIa, or then G is enamine, more preferably that at least F or G or both are an enamine radical as selectable from above said group or that both F and G are imino, with G, F each bearing at least one, preferably precisely one, aryl radical with each said aryl radical bearing at least one halogen or at least one tert. alkyl substituent, preferably precisely one halogen, or one tert.alkyl, in the ortho-position, $R^{1C}$-$R^{3C}$ are each, independently of one another, hydrogen $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, halogen, $NR^{18C}{}_2$, $OR_{18C}$, $SiR^{19C}{}_3$, where the organic radicals $R^{1C}$-$R^{3C}$ may also be substituted by halogens and/or two vicinal radicals $R^{1C}$-$R^{3C}$ may also be joined to form a five-, six- or seven-membered ring, and/or two vicinal radicals $R^{1C}$-$R^{3C}$ are joined to form a five-, six- or seven-membered heterocycle containing at least one atom from the group consisting of N, P, O and S, $R^A$, $R^B$ independently of one another denote hydrogen, $C_1$-$C_{20}$-alkyl, $C_2$-$C_{20}$-alkenyl, $C_6$-$C_{20}$-aryl, arylalkyl having 1 to 10 C atoms in the alkyl radical and 6 to 20 C atoms in the aryl radical, or $SiR^{19C}{}_3$, wherein the organic radicals $R^A$, $R^B$ can also be substituted by halogens, and/or in each case two radicals $R^A$, $R^B$ can also be bonded with one another to form a five- or six-membered ring, $R^C$, $R^D$ independently of one another denote hydrogen, $C_1$-$C_{20}$-alkyl, $C_2$-$C_{20}$-alkenyl, $C_6$-$C_{20}$-aryl, arylalkyl having 1 to 10 C atoms in the alkyl radical and 6 to 20 C atoms in the aryl radical, or $SiR^{19C}{}_3$, wherein the organic radicals $R^C$, $R^D$ can also be substituted by halogens, and/or in each case two radicals $R^C$, $R^D$ can also be bonded with one another to form a five- or six-membered ring, $E^{1C}$ is nitrogen or phosphorus, in particular nitrogen, $E^{2C}$-$E^{4C}$ are each, independently of one another, carbon, nitrogen or phosphorus, more preferably that 0, 1 or 2 atoms selected from the group consisting of $E^{2C}$-$E^{4C}$ are nitrogen with the proviso that the remainder are carbon, most preferably that $E^{2C}$-$E^{4C}$ are carbon, u is 0 when $E^{2C}$-$E^{4C}$ is nitrogen or phosphorus and is 1 when $E^{2C}$-$E^{4C}$ is carbon, the radicals $X^C$ are each, independently of one another, fluorine, chlorine, bromine, iodine, hydrogen, $C_1$-$C_{10}$-alkyl, $C_2$-$C_{10}$-alkenyl, $C_6$-$C_{20}$-aryl, alkylaryl having 1-10 carbon atoms in the alkyl part and 6-20 carbon atoms in the aryl part, $NR^{18C}{}_2$, $OR^{18C}$, $SR^{18C}$, $SO_3R^{18C}$, $OC(O)R^{18C}$, CN, SCN, —-diketonate, CO, $BF_4^-$, $PF_6^-$ or a bulky noncoordinating anion and the radicals $X^C$ may be joined to one another, the radicals $R^{18C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part, $SiR^{19C}{}_3$, where the organic radicals $R^{18C}$ may also be substituted by halogens or nitrogen- and oxygen-containing groups and two radicals $R^{18C}$ may also be joined to form a five- or six-membered ring, the radicals $R^{19C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part, where the organic radicals $R^{19C}$ may also be substituted by halogens or nitrogen- and oxygen-containing groups and two radicals $R^{19C}$ may also be joined to form a five- or six-membered ring, s is 1, 2, 3 or 4, in particular 2 or 3, D is an uncharged donor and t is from 0 to 4, in particular 0, 1 or 2.

The three atoms $E^{2C}$ to $E^{4C}$ in a molecule can be identical or different. If $E^{1C}$ is phosphorus, then $E^{2C}$ to $E^{4C}$ are preferably each carbon. If $E^{1C}$ is nitrogen, then $E^{2C}$ to $E^{4C}$ are each preferably nitrogen or carbon, in particular carbon.

The substituents $R^{1C}$-$R^{3C}$ can be varied within a wide range. Possible carboorganic substituents $R^{1C}$-$R^{3C}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituents, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where two radicals $R^{1C}$ to $R^{3C}$ may also be joined to form a 5-, 6- or 7-membered ring and/or two of the, suitably vicinal, radicals $R^{1C}$-$R^{3C}$ may be joined to form a five-, six- or seven-membered heterocycle containing at least one atom from the group consisting of N, P, O and S and/or the organic radicals $R^{1C}$-$R^{3C}$ may also be substituted by halogens such as fluorine, chlorine or bromine. Furthermore, $R^{1C}$-$R^{3C}$ can also be amino $NR^{18C}{}_2$ or $N(SiR^{19C}{}_3)_2$, alkoxy or aryloxy $OR^{18C}$, for example dimethylamino, N-pyrrolidinyl, picolinyl, methoxy, ethoxy or isopropoxy or halogen such as fluorine, chlorine or bromine. Possible radicals $R^{19C}$ in organosilicon substituents $SiR^{19C}_3$ are the same carboorganic radicals as have been described above for $R^{1C}$-$R^{3C}$, where two $R^{19C}$ may also be joined to form a 5- or 6-membered ring, e.g. trimethylsilyl, triethylsilyl, butyldimethylsilyl, tributylsilyl, tri-tert-butylsilyl, triallylsilyl, triphenylsilyl or dimethylphenylsilyl. These $SiR^{19C}_3$ radicals may also be bound to $E^{2C}$-$E^{4C}$ via an oxygen or nitrogen, for example trimethylsilyloxy, triethylsilyloxy, butyldimethylsilyloxy, tributylsilyloxy or tri-tert-butyl-silyloxy.

Preferred radicals $R^{1C}$-$R^{3C}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, ortho-dialkyl- or -dichloro-substituted phenyls, trialkyl- or trichloro-substituted phenyls, naphthyl, biphenyl and anthranyl. Particularly preferred organosilicon substituents are trialkylsilyl groups having from 1 to 10 carbon atoms in the alkyl radical, in particular trimethylsilyl groups.

The ligands $X^C$ result, for example, from the choice of the appropriate starting metal compounds used for the synthesis of the iron complexes, but can also be varied afterward. Possible ligands $X^C$ are, in particular, the halogens such as fluorine, chlorine, bromine or iodine, in particular chlorine. Alkyl radicals such as methyl, ethyl, propyl, butyl, vinyl, allyl, phenyl or benzyl are also usable ligands $X^C$. As further ligands $X^C$, mention may be made, purely by way of example and in no way exhaustively, of trifluoroacetate, $BF_4^-$, $PF_6^-$ and weakly coordinating or noncoordinating anions (cf., for example, S. Strauss in Chem. Rev. 1993, 93, 927-942), e.g. $B(C_6F_5)_4^-$. Amides, alkoxides, sulfonates, carboxylates and β-diketonates are also particularly useful ligands $X^C$. Some of these substituted ligands X are particularly preferably used since they are obtainable from cheap and readily available starting materials. Thus, a particularly preferred embodiment is that in which $X^C$ is dimethylamide, methoxide, ethoxide, isopropoxide, phenoxide, naphthoxide, triflate, p-toluenesulfonate, acetate or acetylacetonate.

The number s of the ligands $X^C$ depends on the oxidation state of the iron. The number s can thus not be given in general terms. The oxidation state of the iron in catalytically active complexes is usually known to those skilled in the art. However, it is also possible to use complexes whose oxidation state does not correspond to that of the active catalyst. Such complexes can then be appropriately reduced or oxidized by means of suitable activators. Preference is given to using iron complexes in the oxidation state +3 or +2.

D is an uncharged donor, in particular an uncharged Lewis base or Lewis acid, for example amines, alcohols, ethers, ketones, aldehydes, esters, sulfides or phosphines which may be bound to the iron center or else still be present as residual solvent from the preparation of the iron complexes.

The number t of the ligands D can be from 0 to 4 and is often dependent on the solvent in which the iron complex is prepared and the time for which the resulting complexes are dried and can therefore also be a nonintegral number such as 0.5 or 1.5. In particular, t is 0, 1 to 2.

Variation of the radicals $R^{18C}$ enables, for example, physical properties such as solubility to be finely adjusted. Possible carboorganic substituents $R^{18C}$ are, for example, the following: $C_1$-$C_{20}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{20}$-alkenyl which may be linear, cyclic or branched and in which the double bond may be internal or terminal, e.g. vinyl, allyl, hexenyl, cyclopentenyl, cyclohexenyl, cyclooctenyl or cyclooctadienyl, $C_6$-$C_{20}$-aryl which may be substituted by further alkyl groups and/or N- or O-containing radicals, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, 2-methoxyphenyl, 2-N,N-dimethylaminophenyl, or arylalkyl which may be substituted by further alkyl groups, e.g. benzyl, o-, m-, p-methylbenzyl, 1- or 2-ethylphenyl, where two radicals $R^{18C}$ may also be joined to form a 5- or 6-membered ring and the organic radicals $R^{18C}$ may also be substituted by halogens such as fluorine, chlorine or bromine. Possible radicals $R^{19C}$ in organosilicon substituents $SiR^{19C}_3$ are the same radicals which have been described above for $R^{18C}$, where two radicals $R^{19C}$ may also be joined to form a 5- or 6-membered ring, e.g. trimethylsilyl, triethylsilyl, butyldimethylsilyl, tributylsilyl, triallylsilyl, triphenylsilyl or dimethylphenylsilyl. Preference is given to using $C_1$-$C_{10}$-alkyl such as methyl, ethyl, n-propyl, n-butyl, tert-butyl, n-pentyl, n-hexyl, n-heptyl, n-octyl, and also vinyl allyl, benzyl and phenyl as radicals $R^{18C}$.

As for preferred embodiments of aforesaid iron complexes B), reference is made to the respective disclosure in WO 2005/103095, incorporated herewith by reference.

The preparation of the compounds B) is described, for example, in J. Am. Chem. Soc. 120, p. 4049 ff. (1998), J. Chem. Soc., Chem. Commun. 1998, 849, and WO 98/27124. Preferred complexes B) are 2,6-Bis[1-(2-tert.butylphenylimino)ethyl]pyridine iron(II) dichloride, 2,6-Bis[1-(2-tert.butyl-6-chlorophenylimino)ethyl]pyridine iron(II) dichloride, 2,6-Bis[1-(2-chloro-6-methyl-phenylimino)ethyl] pyridine iron(II) dichloride, 2,6-Bis[1-(2,4-dichlorophenylimino)ethyl]pyridine iron(II) dichloride, 2,6-Bis[1-(2,6-dichlorophenylimino)ethyl]pyridine iron(II) dichloride, 2,6-Bis[1-(2,4-dichlorophenylimino)methyl]pyridine iron(II) dichloride, 2,6-Bis[1-(2,4-dichloro-6-methyl-phenylimino)ethyl]pyridine iron(II) dichloride, 2,6-Bis[1-(2, 4-difluorophenylimino)ethyl]pyridine iron(II) dichloride, 2,6-Bis[1-(2,4-dibromophenylimino)ethyl]pyridine iron(II) dichloride or the respective trichlorides, dibromides or tribromides.

Most preferably, one sole hafnocene A) is used as catalyst under the same reaction conditions in the homopolymerization or copolymerization of ethylene in a single reactor along with one sole complex B), and wherein A) preferably produces a higher Mw than does the complex (B). In an even more preferred embodiment, both the components (A) and (B) are supported. The two components (A) and (B) can in this case be applied to different supports or together on a joint support. Most preferably, the catalysts (A) and (B) are preferably applied to a joint support in order to ensure a relatively close spatial proximity of the various catalyst centers and thus to ensure good mixing of the different polymers formed. As for the preferred types and specification of support materials, as well as for the use of activator components in addition to the catalyst, otherwise called co-catalysts, such for instance as mono-methylaluminoxan (MAO), reference is made to the respective disclosure in WO 2005/103095, incorporated herewith by reference. The use of cocatalyst components is well known to the one's skilled in the art of ethylene polymerisation, as are the polymerisation processes and its preferred modes further referenced in the WO 2005/103095, incorporated herewith by reference.

Further objects of the invention are the finished, rotomoulded parts made from said polyethylene a) by rotomoulding, preferably in the absence of a densification aid, in particular any polymeric densification additive. Preferably, the the finished rotomoulded parts comprise no other polymeric constitutent other than at least one polyethylene according to the present invention, or a blend of such polyethylenes.

The following examples illustrate the invention without restricting the scope of the invention.

EXAMPLES

Some methods may have already been described in the foregoing.

The vinyl group content is determined by means of IR in accordance with ASTM D 6248-98.

The branches/1000 carbon atoms are determined by means of $^{13}$C-NMR, as described by James. C. Randall, JMS-REV. Macromol. Chem. Phys., C29 (2&3), 201-317 (1989), and are based on the total content of $CH_3$ groups/1000 carbon atoms. The side chains larger than $CH_3$ and especially ethyl, butyl and hexyl side chain branches/1000 carbon atoms are likewise determined in this way. —The degree of branching in the individual polymer mass fractions is determined by the method of Holtrup (W. Holtrup, Makromol. Chem. 178, 2335 (1977)) coupled with $^{13}$C-NMR. —$^{13}$C-NMR high temperature spectra of polymer were acquired on a Bruker DPX-400 spectrometer operating at 100.61 MHz in the Fourier transform mode at 120° C. The peak $S_{88}$ [C. J. Carman, R. A. Harrington and C. E. Wilkes, Macromolecules, 10, 3, 536 (1977)] carbon was used as internal reference at 29.9 ppm. The samples were dissolved in 1,1,2,2-tetrachloroethane-d2 at 120° C. with a 8% wt/v concentration. Each spectrum was acquired with a 90° pulse, 15 seconds of delay between pulses and CPD (WALTZ 16) to remove 1H-13C coupling. About 1500-2000 transients were stored in 32K data points using a spectral window of 6000 or 9000 Hz. The assignments of the spectra, were made referring to Kakugo [M. Kakugo, Y. Naito, K. Mizunuma and T. Miyatake, Macromolecules, 15, 4, 1150, (1982)] and J. C. Randal, Macromol. Chem Phys., C29, 201 (1989).

NMR samples were placed in tubes under inert gas and, if appropriate, melted. The solvent signals served as internal standard in the NMR spectra and their chemical shift was converted into the values relative to TMS.

The density [g/cm$^3$] was determined in accordance with ISO 1183.

The determination of the molar mass distributions and the means Mn, Mw, $M_z$ and Mw/Mn derived therefrom was carried out by high-temperature gel permeation chromatography using a method essentially described in DIN 55672-1:1995-02 issue Februar 1995. The methodological deviations applied in view of the mentioned DIN standard are as follows: Solvent was 1,2,4-trichlorobenzene (TCB), temperature of apparatus and solutions was 135° C. and as a concentration detector, use of a PolymerChar (Valencia, Paterna 46980, Spain) IR-4 infrared detector, capable for use with TCB.

A WATERS Alliance 2000 equipped with the following precolumn SHODEX UT-G and separation columns SHODEX UT 806 M (3x) and SHODEX UT 807 connected in series was used. The solvent was vacuum destilled under Nitrogen and was stabilized with 0.025% by weight of 2,6-di-tert-butyl-4-methylphenol. The flowrate used was 1 ml/min, the injection was 500 µl and polymer concentration was in the range of 0.01%<conc.<0.05% w/w. The molecular weight calibration was established by using monodisperse polystyrene (PS) standards from Polymer Laboratories (now Varian, Inc., Essex Road, Church Stretton, Shropshire, SY6 6AX, UK) in the range from 580 g/mol up to 11600000 g/mol and additionally Hexadecane. The calibration curve was then adapted to Polyethylene (PE) by means of the Universal Calibration method (Benoit H., Rempp P. and Grubisic Z., & in J. Polymer Sci., Phys. Ed., 5, 753(1967)). The Mark-Houwing parameters used herefore were for PS: $k_{PS}$=0.000121 dl/g, $\alpha_{PS}$=0.706 and for PE $k_{PE}$=0.000406 dl/g, $\alpha_{PE}$=0.725, valid in TCB at 135° C. Data recording, calibration and calculation was carried out using NTGPC_Control_V6.02.03 and NTGPC_V6.4.24 (hs GmbH, Hauptstraßße 36, D-55437 Ober-Hilbersheim) respectively.

The stress crack resistance ('full notch creep test', FNCT)) was determined in [h] according to ISO16770:2004 E at a pressure of 6 Mbar at 50° C. in a 2% by weight solution of Akropal N100 (Trademark of Clariant AG, Muttenz/Switzerland, which detergent is CAS 9016-45-9, (4-nonlyphenyl) polyethylenglycolmonoether, with n=10 for the repeat units in the PEG chain) in water, including test specimen preparation as a compressed plate as described in ISO 16770:2004 E. —The time to failure is shortened by initiating a crack by means of the notch in 2% Arkopal solution as a stress crack promoting medium. The dimension of the notch are given in the ISO standard.

Abbreviations in the table below:

| | |
|---|---|
| Cat. | Catalyst |
| T(poly) | Polymerisation temperature |
| $M_w$ | Weight average molar mass |
| $M_n$ | Number average molar mass |
| $M_z$ | z-average molar mass |
| Density | Polymer density |
| Prod. | Productivity of the catalyst in g of polymer obtained per g of catalyst used per hour |
| total-CH3 is the amount of CH3-groups per 1000 C including end groups | |

Bis(n-butylcyclopentadienyl)hafnium dichloride is commercially available from Crompton Ltd.

A. Preparation of the Individual Catalyst Components 2,6-Bis[1-(2-tert.butylphenylimino)ethyl]pyridine was prepared as in example 6 of WO 98/27124 and 2,6-Bis[1-(2-tert.butylphenylimino)ethyl]pyridine iron(II) dichloride was prepared as in example 15 of WO 98/27124.

2,6-Bis[1-(2,4,6-trimethylphenylimino)ethyl]pyridine was prepared as in example 1 of WO 98/27124 and reacted in an analogous manner with iron(II) chloride to give 2,6-Bis[1-(2,4,6-trimethylphenylimino)ethyl]pyridine iron(II) dichloride, as likewise disclosed in WO 98/27124.

2,6-Bis[1-(2,4-dichloro-6-methylphenylimino)ethyl]pyridine iron(II) dichloride was prepared according to the method of Qian et al., Organometallics 2003, 22, 4312-4321. Here, 65.6 g of 2,6-diacetylpyridine (0.4 mol), 170 g of 2,4-dichloro-6-methylaniline (0.483 mol), 32 g of silica gel type 135 and 160 g of molecular sieves (4 Å) were stirred in 1500 ml of toluene at 80° C. for 5 hours and a further 32 g of silica gel type 135 and 160 g of molecular sieves (4 Å) were subsequently added. The mixture was stirred at 80° C. for a further 8 hours, the insoluble solid was filtered off and washed twice with toluene. The solvent was distilled off from the filtrate obtained in this way, the residue was admixed with 200 ml of methanol and subsequently stirred at 55° C. for 1 hour. The suspension formed in this way was filtered and the solid obtained was washed with methanol and freed of the solvent. This gave 95 g of 2,6-Bis[1-(2,4,6-trimethylphenylimino) ethyl]pyridine in 47% yield. The reaction with iron(II) chloride was carried out as described by Qian et al., Organometallics 2003, 22, 4312-4321.

2,6-Bis[1-(4,6-Dimethyl-2-chloro-phenylimino)ethyl]pyridine iron(II) dichloride was prepared in analogy to 2,6-Bis[1-(2,4-dichloro-6-methylphenylimino)ethyl]pyridine iron(II) dichloride as described above.

B) Preparation of the Mixed Catalyst Systems Employed for Synthesis of the Polyethylene a):

Example 1 a) Support Pretreatment

XPO-2107, a spray-dried silica gel from Grace, was calcinated at 600° C. for 6 hours and subsequently 252.2 g of the dried silica gel admixed with 164.5 ml of MAO (4.75 M in Toluol, 0.78 mol). The mixture was stirred for one hour, filtered, the solid washed with toluene and then died under reduced pressure.

b) Preparation of the Mixed Catalyst Systems

A mixture of 1.48 g (2.45 mmol) of 2,6-Bis[1-(2,4-dichloro-6-methylphenylimino)ethyl]pyridine iron(II) dichloride, 3.61 g (7.34 mmol) of bis(n-butylcyclopentadienyl)hafnium dichloride and 159.6 ml of MAO (4.75 M in toluene, 0.76 mol) was stirred at room temperature for 1 h and subsequently added while stirring to a suspension of 237.1 g of the pretreated support material a) in 800 ml of toluene. The mixture was stirred at room temperature for a further 3 hours, the resulting solid filtered off and washed with toluene. The solid was dried under reduced pressure until it was free-flowing. This gave 256.7 g of catalyst.

Example 2 a) Support Pretreatment

XPO-2107, a spray-dried silica gel from Grace, was calcinated at 600° C. for 6 hours.

b) Preparation of the Mixed Catalyst Systems

A mixture of 5.35 g (9.69 mmol) of 2,6-Bis[1-(2-tert.butylphenylimino)ethyl]pyridine iron(II) dichloride, 7.49 g (15.22 mmol) of bis(n-butylcyclopentadienyl)hafnium dichloride and 472 ml of MAO (4.75 M in toluene, 2.24 mol) was stirred at room temperature for 30 minutes and subsequently added while stirring to a suspension of 276.8 g of the pretreated support material a) during the course of 45 minutes ((Fe+Hf):Al=1:90). The solid was dried under reduced pressure until it was free-flowing. This gave 609 g of catalyst which still contained 31.5% by weight of solvent (based on the total weight and calculated on the basis of complete application of all components to the support).

Examples 3

Support pretreatment and preparation of the mixed catalyst systems were done essentially as described in example 1, except that 2,6-Bis[1-(4,6-Dimethyl-2-chloro-phenylimino)ethyl]pyridine iron(II) dichloride was employed instead as the iron catalyst complex.

C. Polymerization of the Catalysts

The polymerization was always carried out in a fluidized-bed reactor having a diameter of 0.5 m. The reaction temperature was in the range of 94-105° C., the output in the range of 3.1 to 3.8 kg/h, ethylene was dosed at 3-5 kg/h and 1-hexene at 50 to 100 g/h, hydrogen gas was metered at 0.5 to 1.5 l/h. The pressure in the reactor was 20 bar. 0.1 g of triisobutylaluminum per hour were metered in each case, except for comparative examples where hydrogen was metered at about 3-4 l/h. More detailed information on representative, individual synthetic polymerization protocols is published in WO2005/103095. Catalysts were the catalysts from at least one of examples 1-3. Post-reactor granulation took place in a twin screw extruder, having a gear-pump operated discharger unit. The polyethylene product had the specification commensurate with the claims and description.

D. Rotomoulding

Example 4

The polyethylene product obtained from the polymerization step was used for rotomoulding of symmetrically shaped vessels having an even wall of constant thickness. The polyethylene of the present invention allows in general of devising rotomoulded objects having good FNCT (Full Notch Creep Test, according to ISO 16770:2004 E, at 6 Mpa, 50° C.), increased impact resistance in the cold as evidenced by superior tensile impact testing at −30° C. whilst not requiring the aid of densification agents for rotomoulding, in particular no polymeric ones. Furthermore, the polyethylene of the present invention in general allows of faster processing due to its enhanced melt flow rate, thought without having any adverse trade off on afore said mechanical properties; this is outstanding, increased melt flow rate allowing of increased productivity, more complex mouldings and shortened cooking cycle times whilst having the mechanical stiffness preserved or even enhanced (in the cold), as said before.

Except for the additives, the rotomoulding process given in EP-1749058, inclusive the temperature profile given in the examples section there, is applied.

The following additives were used for the experimental grade GX5003 according to the present invention, devised by a catalyst system according to preferably example 3 above: Zn Stearate, stabilizer ADK Pep-36 (from Adeka Palmarole Inc., substance is CAS No. 80693-00-1, Bis(2,6-ditert.butyl-e-methylphenyl)pentaerythritol-diphosphite, further 3 different antioxidants.

The invention claimed is:

1. A polyethylene copolymer comprising, a copolymer of ethylene and 1-hexene,
wherein the polyethylene copolymer has:
(i) a molar mass distribution width Mw/Mn from 7 to 15,
(ii) a density from 0.934 to 0.938 g/cm$^3$,
(iii) a weight average molar mass Mw from 20,000 g/mol to 500,000 g/mol,
(iv) a high load melt index from 190 to 320 g/10 min, and
(v) a melt flow rate (MI, at 2.16 kg) from 6.5 to 8 g/10 min.

2. The polyethylene copolymer of claim 1, wherein the polyethylene copolymer has from 0.7 to 20 CH$_3$/1000 carbon atoms as determined by NMR.

3. The polyethylene copolymer of claim 1, wherein the polyethylene copolymer comprises 1-hexene in an amount of greater than 3 wt %, based on the total weight of the polyethylene copolymer.

4. The polyethylene copolymer of claim 1, wherein the polyethylene copolymer has a vinyl group content of at least 0.6 vinyl groups/1000 C atoms.

5. The polyethylene copolymer of claim 4, wherein the polyethylene copolymer has a vinyl group content of 0.9 vinyl groups/1000 C atoms.

6. The polyethylene copolymer of claim 5, wherein the amount of polyethylene copolymer with a molar mass below 1 million g/mol, as determined by GPC, is above 95.5% by weight.

7. The polyethylene copolymer of claim 1, wherein the polyethylene copolymer has a η(vis) value from 0.3 to 7 dl/g as determined according to ISO 1628-1 and -3 in decalin at 135° C.

8. The polyethylene copolymer of claim 1, wherein the polyethylene copolymer has been prepared in one polymerization step in a single reactor by a mixed catalyst system comprising at least one metallocene.

9. The polyethylene copolymer of claim 8, wherein the polyethylene copolymer is obtained by polymerization of ethylene and hexene in the presence of a catalyst composition comprising at least two different single-site polymerization catalysts.

10. The polyethylene copolymer of claim 9, wherein the polyethylene copolymer is obtained by copolymerizing ethylene and hexene at a temperature of from 20 to 200° C. and at a pressure of from 0.05 to 1 MPa.

11. The polyethylene copolymer of claim 9, wherein the at least two different single-site polymerization catalysts comprise a single-site catalyst A) based on hafnocene and a single-site catalyst B) based on an iron component having a tridentate ligand bearing at least two aryl radicals.

12. The polyethylene copolymer of claim 11, wherein each of the aryl radicals bear a halogen or tert-alkyl substituent in the ortho-position.

13. The polyethylene copolymer of claim 1, further comprising non-polymeric additives selected from lubricants, antioxidant, stabilizers, or mixtures thereof.

14. The polyethylene copolymer of claim 1, being devoid of densification aids.

15. A rotomoulded article comprising a polyethylene copolymer according to claim 1.

16. The rotomoulded article of claim 15, comprising no densification aids.

17. The rotomoulded article of claim 16, wherein the article has a volume of at least 50 L.

18. The rotomoulded article of claim 17, wherein the rotomoulded article has a volume of at least 100 L.

19. The rotomoulded article of claim 18, wherein the rotomoulded article has a volume of at least 300 L.

20. The rotomoulded article of claim 15, comprising the polyethylene copolymer or a mixture comprising the polyethylene copolymer as the only polymeric constituent.

* * * * *

UNITED STATES PATENT AND TRADEMARK OFFICE
CERTIFICATE OF CORRECTION

PATENT NO. : 8,716,423 B2  
APPLICATION NO. : 13/390924  
DATED : May 6, 2014  
INVENTOR(S) : Gerd Mannebach et al.

It is certified that error appears in the above-identified patent and that said Letters Patent is hereby corrected as shown below:

In the specification

| | | |
|---|---|---|
| Column 2 | Line 55 | Delete "and" and insert --und-- |
| Column 7 | Equation (IIIa) | Delete "$FeX_s^C D^{t}$" and insert --$FeX_s^C D_t$-- |
| Column 7 | Line 49 | Delete "$OR_{18C}$," and insert --$OR^{18C}$,-- |
| Column 11 | Line 27 | Delete "$S_{88}$" and insert --$S_{\delta\delta}$-- |
| Column 12 | Line 9 | Delete "Hauptstrafßse" and insert --Hauptstraße-- |

Signed and Sealed this  
Twenty-second Day of March, 2016

Michelle K. Lee  
*Director of the United States Patent and Trademark Office*